(12) United States Patent
Hinojosa (10) Patent No.: US 12,060,746 B2
(45) Date of Patent: Aug. 13, 2024

(54) GATE OPENER STAND AND METHOD OF MANUFACTURE AND INSTALLATION

(71) Applicant: Troy Hinojosa, Corpus Christi, TX (US)

(72) Inventor: Troy Hinojosa, Corpus Christi, TX (US)

(*) Notice: Subject to any disclaimer, the term of this patent is extended or adjusted under 35 U.S.C. 154(b) by 0 days.

(21) Appl. No.: 17/735,341

(22) Filed: May 3, 2022

(65) Prior Publication Data

US 2022/0282570 A1   Sep. 8, 2022

Related U.S. Application Data (63) Continuation of application No. 29/744,677, filed on Jul. 30, 2020, now Pat. No. Des. 950,773.

(51) Int. Cl.
| | | |
|---|---|---|
| *E06B 11/04* | (2006.01) | |
| *B23K 31/00* | (2006.01) | |
| *B23K 101/34* | (2006.01) | |
| *B23P 17/00* | (2006.01) | |

(52) U.S. Cl.
CPC ............ *E06B 11/045* (2013.01); *B23K 31/00* (2013.01); *B23K 2101/34* (2018.08); *B23P 17/00* (2013.01)

(58) Field of Classification Search
CPC ... E06B 11/045; B23K 31/00; B23K 2101/34; B23K 9/142; B23K 11/10; B23P 17/00; E05Y 2201/656; E05Y 2600/50; E05Y 2600/626; E05Y 2900/40; E05F 15/643; E04H 12/00

See application file for complete search history.

(56) References Cited

U.S. PATENT DOCUMENTS

| | | | |
|---|---|---|---|
| 731,716 A | 6/1903 | Slater | |
| 2,822,630 A * | 2/1958 | Guyer | E05D 15/50 49/193 |
| 4,735,018 A * | 4/1988 | Duncan | E05F 15/53 49/340 |
| 5,373,664 A | 12/1994 | Butler | |
| 6,796,084 B2 | 9/2004 | Gagnon | |
| 6,807,710 B2 * | 10/2004 | Abbott | E05D 5/08 16/221 |
| 9,004,807 B2 | 4/2015 | Slagel | |
| 9,212,521 B2 | 12/2015 | McCarty et al. | |

(Continued)

FOREIGN PATENT DOCUMENTS

| | | |
|---|---|---|
| EP | 0094628 A2 | 11/1983 |
| GB | 2487270 A | 7/2012 |
| WO | 2006010759 A1 | 2/2006 |

*Primary Examiner* — Lawrence Averick
(74) *Attorney, Agent, or Firm* — Miguel Villarreal, Jr.; Gunn, Lee & Cave, P.C.

(57) ABSTRACT

A gate opener stand is comprised of a plurality of support tubing connected to a horizontal brace and a platform at one end of the plurality of support tubing. The opposite ends of the plurality of support tubing are held in place via a brace. The platform includes a pair of ears extending from opposite sides of the platform. Apertures within extended rounded ends of the horizontal brace align with the pair of ears extending from the platform. A pair of braces connects the platform to the horizontal brace and provides additional reinforcement and strength to the gate opener stand. In an alternative embodiment, a method of manufacture and assembly of the gate opener stand is disclosed.

1 Claim, 14 Drawing Sheets

(56) References Cited

U.S. PATENT DOCUMENTS

| | | |
|---|---|---|
| 9,452,761 B2 | 9/2016 | Romero |
| 2003/0200624 A1* | 10/2003 | Abbott ...................... E05F 7/02 16/221 |
| 2004/0111974 A1* | 6/2004 | Boroviak ................ E06B 11/02 49/504 |
| 2006/0284428 A1* | 12/2006 | Beadle .................. E05B 47/026 292/302 |
| 2014/0259930 A1 | 9/2014 | Gilliam |
| 2023/0295976 A1* | 9/2023 | Frushtick .............. E06B 3/5018 49/199 |

\* cited by examiner

GATE OPENER STAND AND METHOD OF MANUFACTURE AND INSTALLATION

CROSS-REFERENCES TO RELATED APPLICATIONS

This original non-provisional patent application claims priority to and the benefit of U.S. design application Ser. No. 29/744,677, filed Jul. 30, 2020, and entitled "Gate Opener Stand," which is incorporated by reference herein.

STATEMENT REGARDING FEDERALLY-SPONSORED RESEARCH OR DEVELOPMENT

Not applicable.

BACKGROUND OF THE INVENTION

1. Field of the Invention

The present invention relates to gate openers. More specifically, the invention relates to a gate opener stand and method of manufacture and installation.

2. Description of the Related Art

There exists in the art gate opener stands. These existing gate opener stands are uniquely configured to fit a particular model or type of gate openers. When a user changes the type of gate opener used, the gate stand opener will also need to be changed out. This is time consuming as it requires digging out the old gate opener stand from the ground. In additional, many times the old gate opener stand is cemented into the ground, requiring additional equipment, tools and manpower to remove. Time is money. The longer the gate opener operator remains inoperable, the higher the expense will be to operate, if possible, the gate (e.g., opening and closing) as now such operation must be done manually. This requires at least one person manning the gate in the event the gate needs to be opened. The expense of employing personnel to operate a gate quickly escalates the longer the gate opener is inoperable. In addition, while the gate opener stand is being removed, there may not be any access (ingress or egress) through this particular gate, especially if heavy equipment is necessary for removal of the gate opener stand, necessitating the parties needing ingress or egress to search for other access points which may or may not be near the vicinity of the inoperable gate.

Another concern with prior art gate opener stands is the expense that comes with all the various components involved their construction. The more components there are, the higher the cost in materials and labor. Additional expenses are needed to pay for the additional and adequate number of personnel needed to make and put the gate stand opener together.

The typical installation time for existing gate opener stand generally vary but often fall within about three days to a week from start to finish. While the gate opener and gate opener stand is being replaced, there is also downtime in that users have no access (ingress or egress) via the downed gate until such time as the gate becomes operable again. This would not occur until the new gate opener and correspondingly configured gate opener stand have been installed.

Accordingly, there is a need for a gate opener stand that may be installed correctly each and every time without the assistance of a professional installer (e.g., a do-it-yourself install) and without the need to perform extensive and expensive ground preparations. There is a further need for such a device that is robust yet safe, and will remain level for the life of the stand, thereby reducing the manufacture and installation time and increasing the safety and enjoyment of the gate opener stand. There is also a need for a gate opener stand that may be assembled and installed quickly and safely with minimal costs and labor, yet be robust enough once complete to provide years of functionality. Finally, there is a need for a gate stand opener that may be retroactively fitted to chassis of older models or types of gate openers such that when it becomes necessary to replace the gate opener with a new one, the gate opener stand does not also need to be changed out, but can still function and accommodate a newer or different model gate opener. The present invention addresses these and other shortcomings of the currently existing gate openers.

BRIEF SUMMARY OF THE INVENTION

The present invention is a gate opener stand that may retroactively fit the chassis of older or different models of gate openers. The gate opener stand of the present invention has a plurality of support tubing connected to a horizontal brace and a platform at one end of the plurality of support tubing. The support tubings are in a square configuration and provide support to the horizontal brace and platform. The opposite ends of the plurality of support tubing are held in place via a brace. The platform includes a pair of ears extending from opposite sides of the platform. Apertures within extended rounded ends of the horizontal brace align with the pair of ears extending from the platform. A pair of braces connects the platform to the horizontal brace and provides additional reinforcement and strength to the gate opener stand.

The plurality of support tubing traverses the horizontal brace and platform via apertures within the extended rounded ends of the horizontal brace and the pair of ears extending from opposite sides of the platform. A large aperture within the platform and two smaller apertures within the horizontal brace accommodate conduit, connectors and wiring of (and as such, retrofit) chassis of any kind or model of gate openers, which may be mounted on the gate opener stand.

Manufacture of the stand includes first cutting all components (save the square support tubing) of the gate opener stand of the present invention using a plasma cutter. Using a jig table (not shown), the components are clamped and secured in place to the jig table for manufacture. The manufacture and assembly of the gate opener stand of the present invention begins in reverse. That is to say, the final product is right side up, but during its manufacture and assembly it is assembled upside down. Each of the components are connected and secured in place with tack welding. When all components are connected as desired, full welding makes the connections permanent. The gate opener stand, once manufactured and assembled, is ready for installation at the desired location.

An additional advantage is that the gate opener stand of the present invention does not require the need for professional installation as end users may do the present invention themselves. Tools the user may be required to use for installation include a level, shovel, cement, measuring tape, and the like. The user should also possess some basic knowledge, such as, measuring skills and how to dig a hole.

The average intended user of the present invention would possess such tools and knowledge.

DETAILED DESCRIPTION OF CERTAIN EMBODIMENTS

Figure 1:
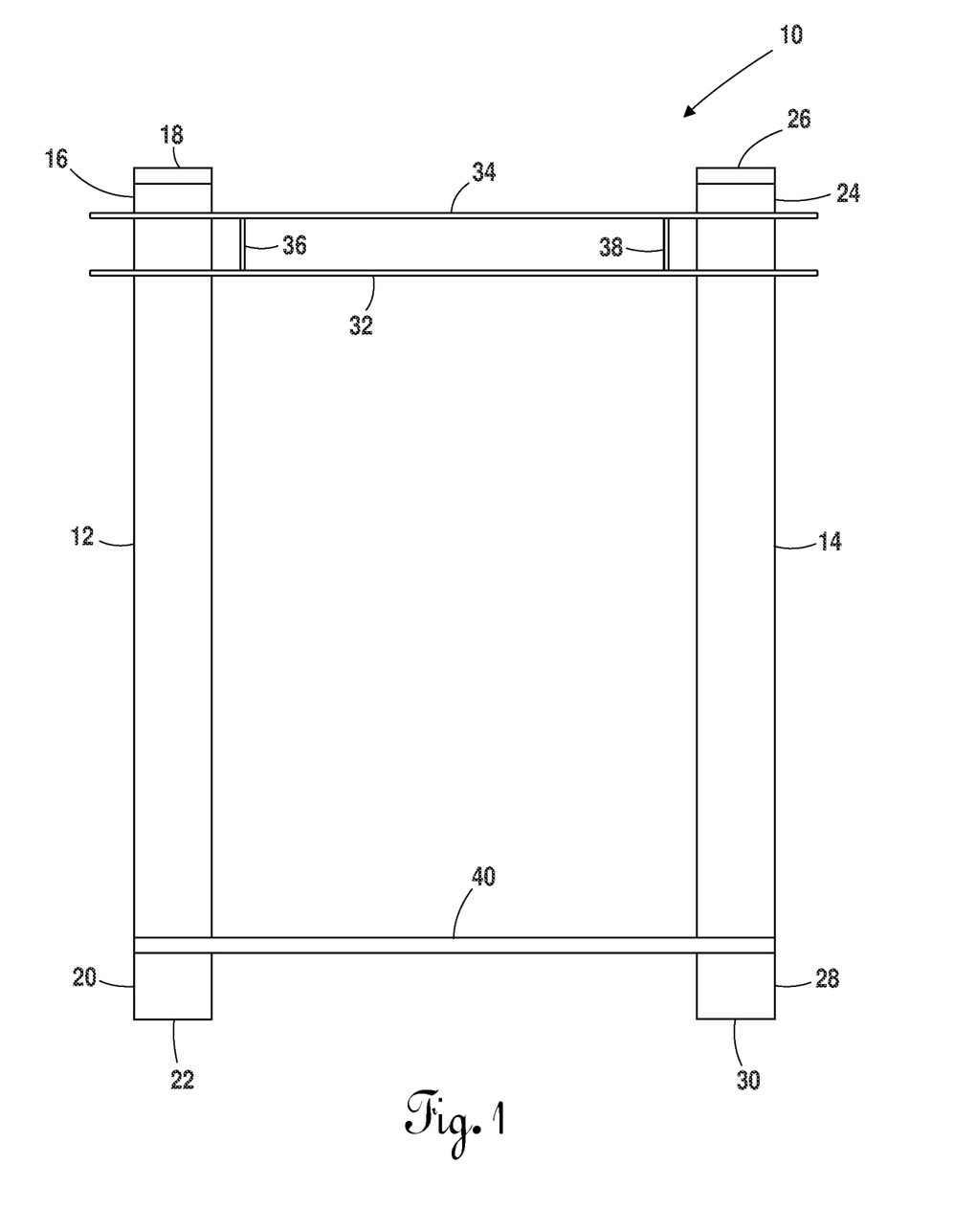
FIG. 1 is a front view of an embodiment of the present invention.

Referring now to FIG. 1, gate opener stand 10 of the present invention is comprised of support tubing 12 having top end 16 and bottom end 20 and support tubing 14 having top end 24 and bottom end 28. Support tubings 12 and 14 are hollow, as indicated by hollow end 22 and hollow end 30. Support tubings 12 and 14 are also in a square configuration. Cap 18 is fitted over top end 16 of support tubing 12. Cap 26 is fitted over top end 24 of support tubing 14, as shown in FIG. 1.

Figure 2:
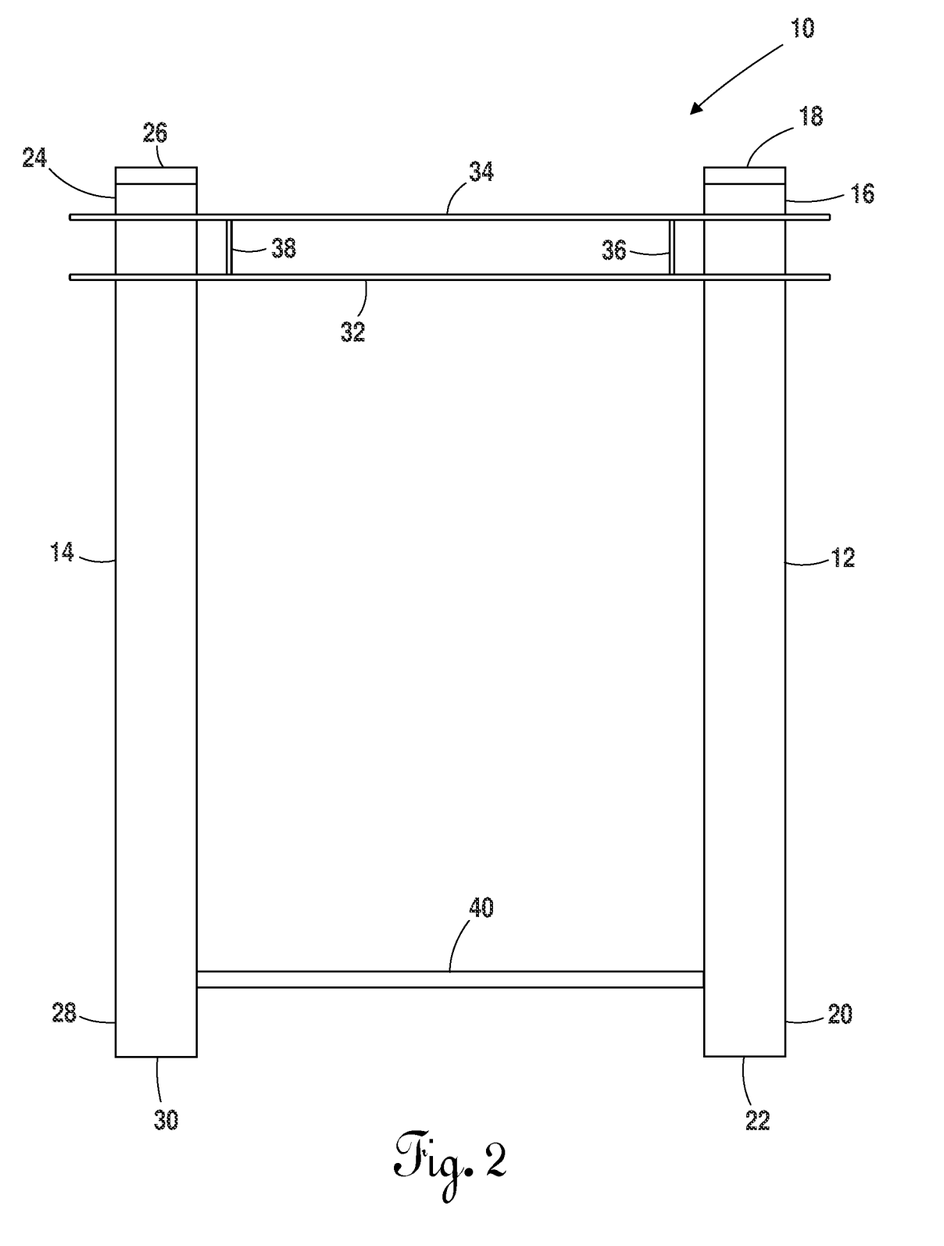
FIG. 2 is a back view with respect to FIG. 1 of an embodiment of the present invention.

Still referring to FIG. 1, platform 34 and horizontal brace 32 are secured (welded) to support tubing 12 and support tubing 14 at top ends 16 and 24 of support tubing 12 and support tubing 14, respectively. Platform braces 36 and 38 between platform 34 and horizontal brace 32 provide reinforcement and stability to gate opener stand 10. Brace 40 connects at one end to support tubing 12 and connects at the other end to support tubing 14. Brace 40 provides for added stability during manufacture and assembly of gate opener stand 10 but may be removed during final assembly. FIG. 2 shows a back view of gate opener stand 10.

Figure 3:
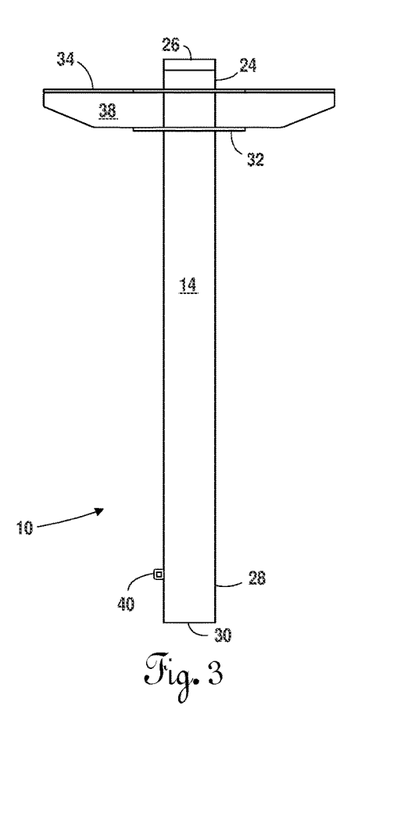
FIG. 3 is a right side view with respect to FIG. 1 an embodiment of the present invention.
Figure 4:
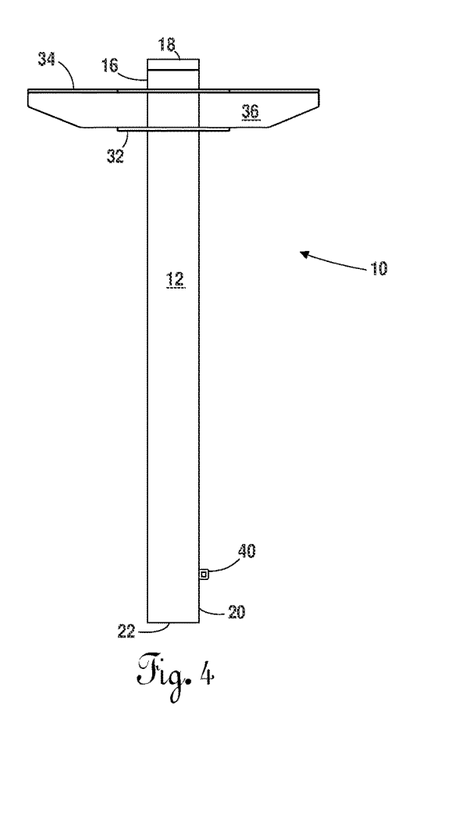
FIG. 4 is a left side view with respect to FIG. 1 an embodiment of the present invention.

Turning now to FIGS. 3 and 4, right and left side views, respectively, are shown. Platform brace 38 connects platform 34 to horizontal brace 32, as shown in FIG. 3. Similarly, platform brace 36 connects platform 34 to horizontal brace 32, as shown in FIG. 4. Platform braces 38 and 36 provide strength and reinforcement to gate opener stand 10. Cap 26 fits within hollow area at top end 24 of support tubing 14, as shown in FIG. 3. Similarly, cap 18 fits within hollow are at top end 16 of support tubing 12, as shown in FIG. 4.

Figure 5:
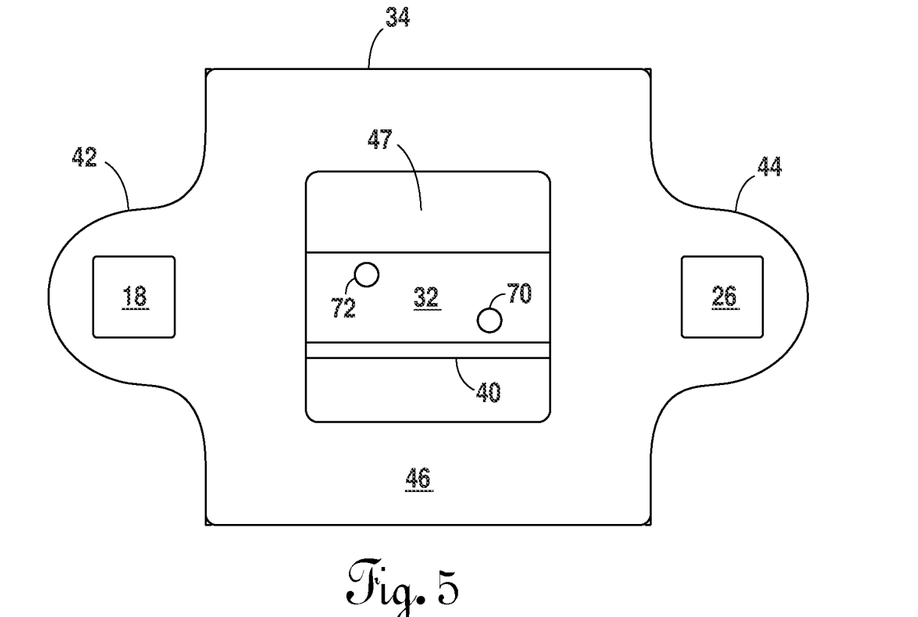
FIG. 5 is a top view of an embodiment of the present invention.

Turning now to FIG. 5, platform 34 has extended ear portion 42 and extended ear portion 44 at opposite ends. Extended ear portion 42 has aperture 62 therein (See FIG. 9) where cap 18 is fitted within hollow end of support tubing 12 traversing therethrough. Extended ear portion 44 has aperture 64 therein (See FIG. 9) where cap 26 is fitted within hollow end of support tubing 14 traversing therethrough. Apertures 62 and 64 are in a square configuration. Platform 34 has top surface 46 and aperture 47 therein.

Referring still to FIG. 5, aperture 47 accounts for almost half of the area of platform 34. Through aperture 47 can be seen a portion of horizontal brace 32 and brace 40. Apertures 70 and 72 appear in a staggered configuration within the center area of horizontal brace 32. Apertures 70, 72 and 47 allow for the passing of conduit, wiring and other connections from a gate opener to pass through the gate opener of the present invention for the required power hookup and for connection to other components.

Figure 6:
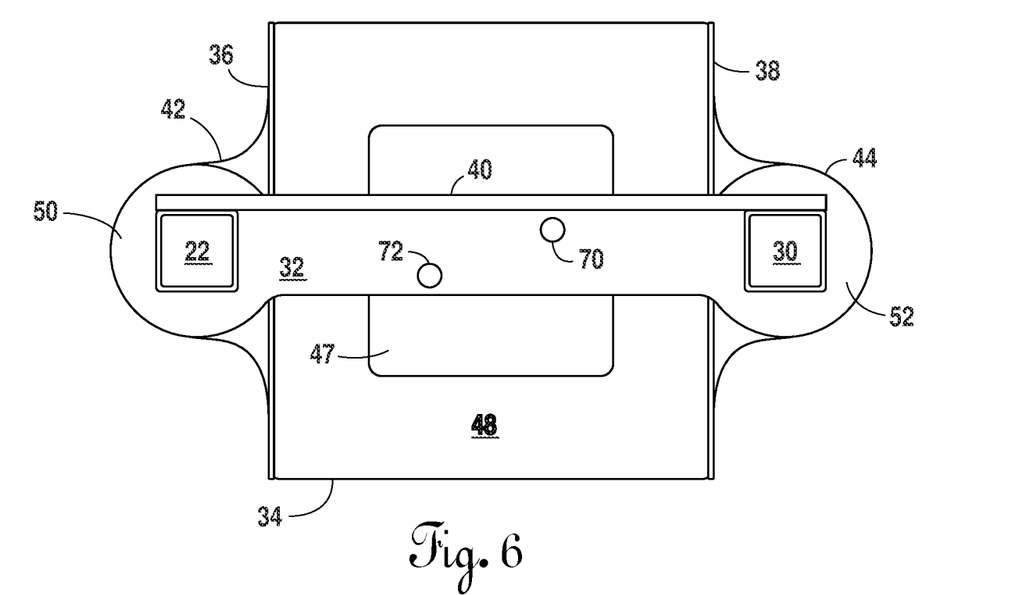
FIG. 6 is a bottom view of an embodiment of the present invention.
Figure 7:
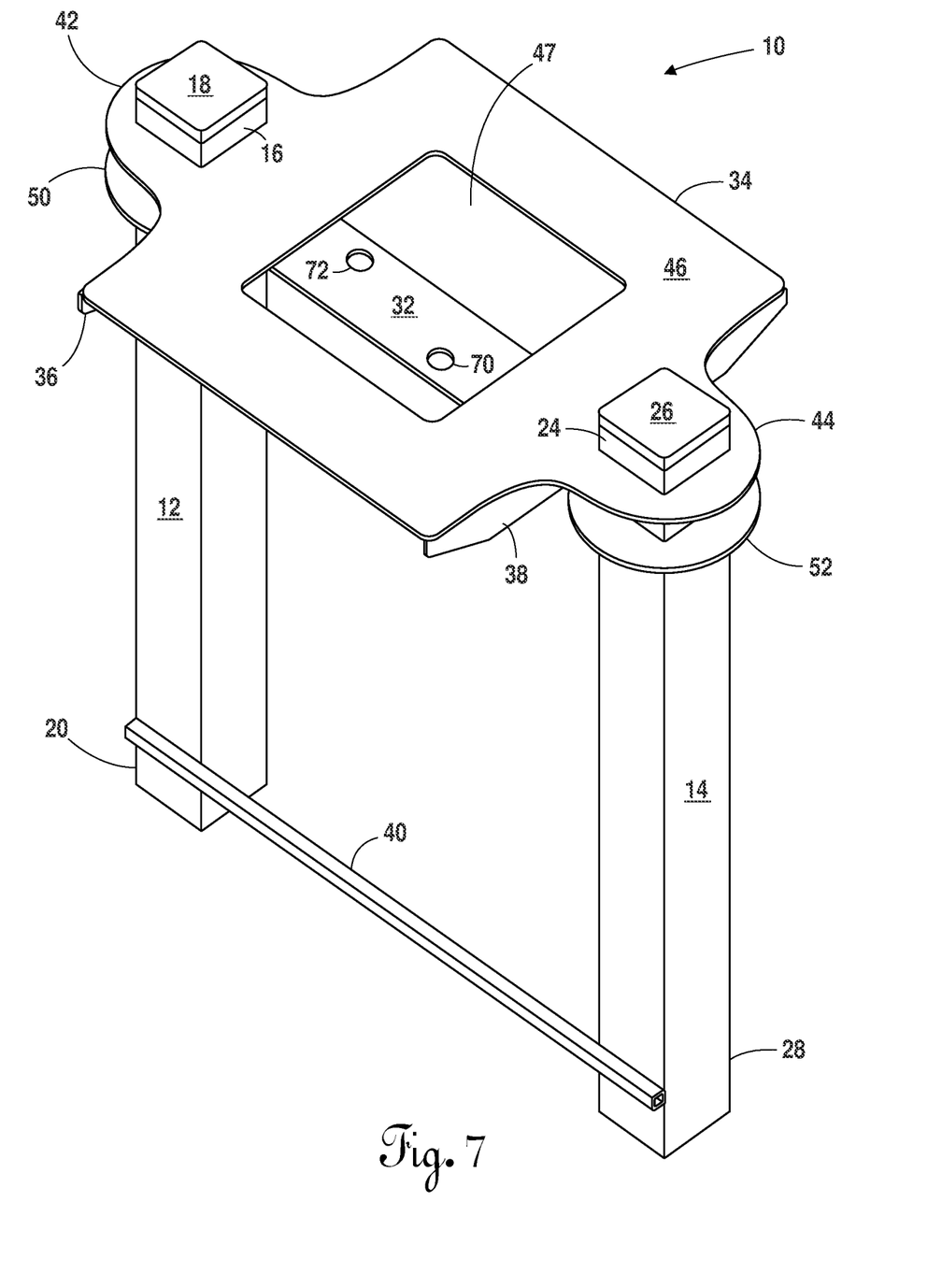
FIG. 7 is a front perspective view of the present invention.
Figure 8:
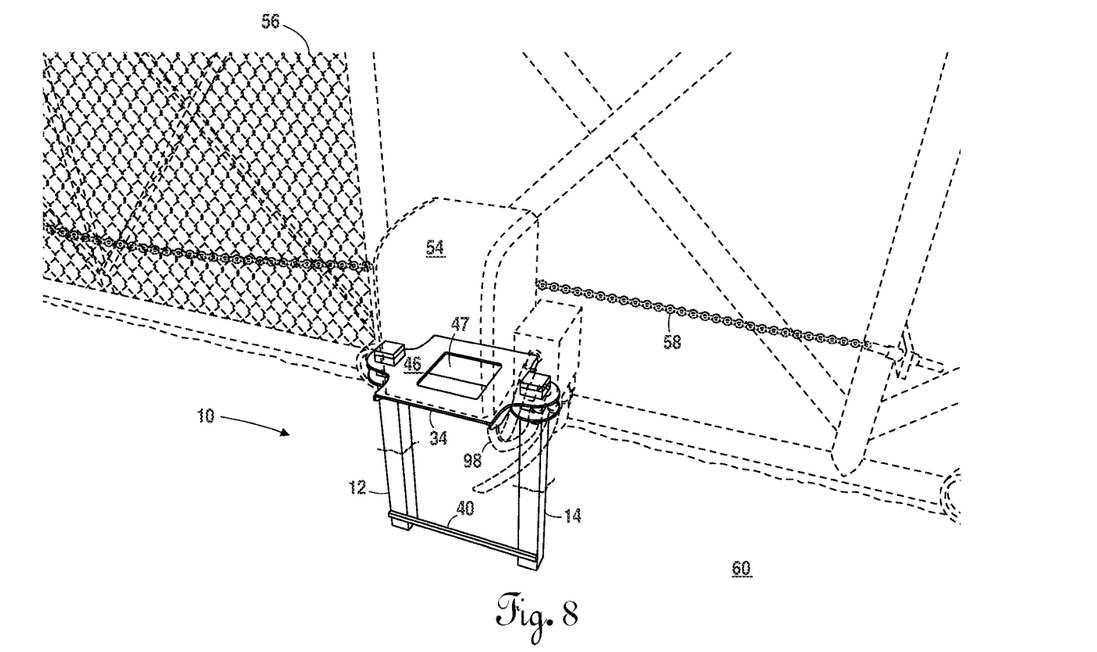
FIG. 8 is an environmental view of the present invention.

Turning to FIG. 6, rounded ends 50 and 52 on either end of horizontal brace 32 are shown with support tubing 12 and 14 traversing therethrough, respectively, terminating in hollow ends 22 and 30. Platform braces 36 and 38 connect platform 34 to horizontal brace 32 via bottom surface 48 of platform 34, as shown in FIG. 6. A perspective view of gate opener stand 10 is shown in FIG. 7. FIG. 8 illustrates gate opener 10 in an environmental view. Gate opener stand 10 is anchored securing into ground 60. Support tubing 12 and 14 of gate opener stand 10 penetrate into ground 60 approximately half the length of support tubing 12 and 14. Gate opener 54 is mounted on top surface 4 of gate opener stand 10 with connections 98 connected to power (not shown). Gate 56 is then pulled via chain 58 once chain 58 has been configured within gate opener 54.

While the present invention uses square configurations for support tubing and corresponding apertures through which support tubing traverses, other configurations, such as a round configuration, may be used and still remain within the contemplation of the present invention.

Figure 9:
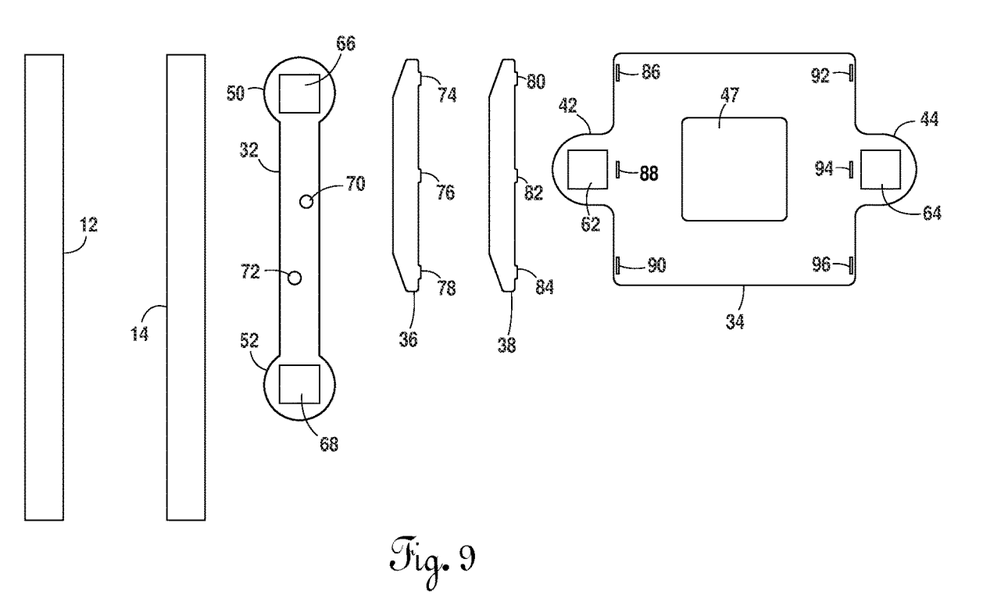
FIG. 9 depicts an exploded view of the components of an embodiment of the present invention, except the temporary brace.

Now describing the method of manufacture and assembly of the gate opener stand of the present invention, and referring also to FIG. 9, the components of gate opener stand 10 are described. These include two support tubings 12 and 14 and horizontal brace 32 having rounded ends 50 and 52 with apertures 66 and 68 therein, respectively. Components further include platform braces 36 and 38. Bracing tabs 74, 76 and 78 extend distally from platform brace 36. Bracing tabs 80, 82 and 84 extend distally from platform brace 38. Bracing tabs 74, 76, 78, 80, 82 and 84 are evenly spaced. The final component is platform 34 which has bracing slots 86, 88 and 90 along the edge closest to extended ear portion 42. Platform 34 also has complimentary bracing slots 90, 94 and 96 along the edge closest to extended ear portion 44.

Still referring to FIG. 9, support tubing 12 and 14 are 3×3-11 gauge black steel tubing cut to 3 ft. in length. Horizontal brace 32 contains apertures 70 and 72 which act as conduit pathways to allow conduit and the like from a gate opener to pass.

Figure 10:
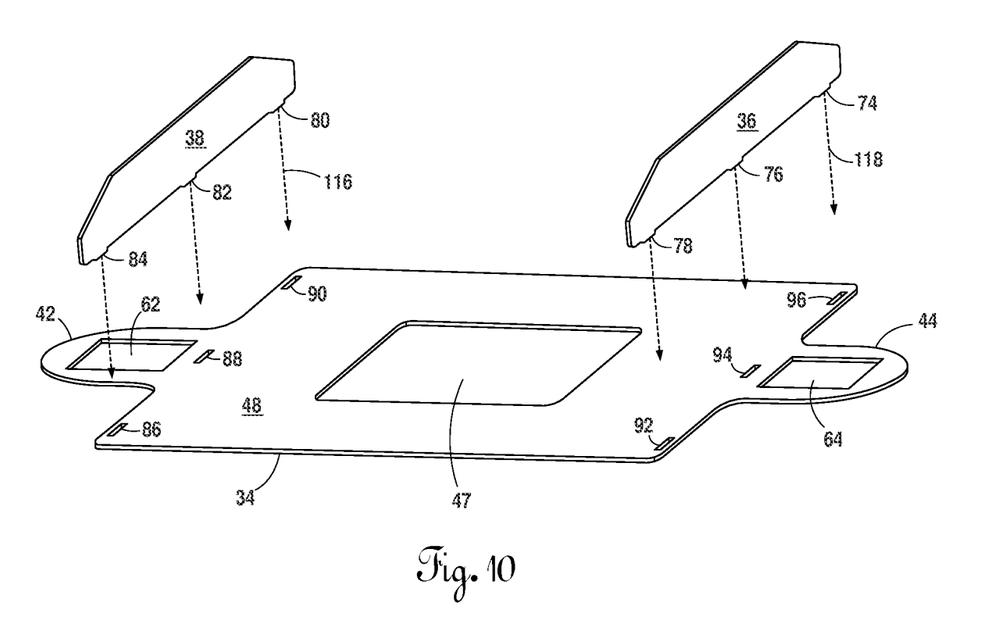
FIG. 10 is a partial exploded view of the present invention showing how the platform braces and platform connect.

Turning now to FIG. 10, platform 34 is placed upside down and clamped to a jig table (not shown), exposing bottom surface 48 of platform 34. Platform brace 38 is lowered down vertical axis 116 with bracing tabs 80, 82, and 84 corresponding to and matable with bracing slots 90, 88 and 86. Similarly, platform brace 36 is lowered down vertical axis 118 with bracing tabs 74, 76 and 78 corresponding to and matable with bracing slots 96, 94 and 92. The ends of the bracing tabs traverse the bracing slots passing through platform 34 but only until the ends of the platform tabs become flush with the opposite surface (top surface 46) of platform 34 (top surface 46 facing downward on the jig table (not shown)). In other words, the platform tabs are squared to the opposite surface area of the platform from which the tabs entered the platform slots.

Figure 11:
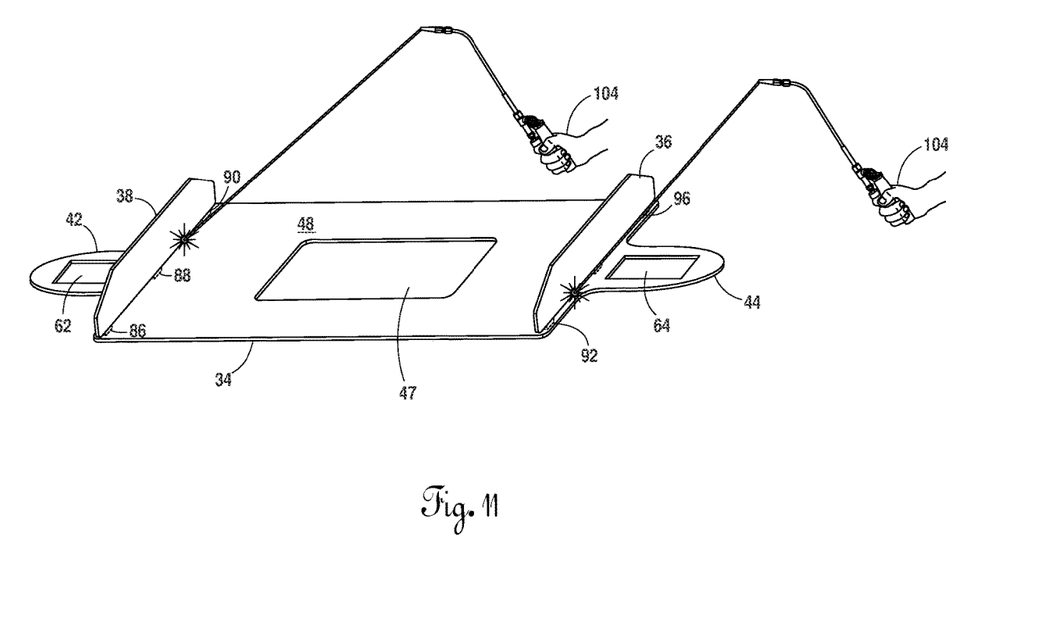
FIG. 11 is a partial exploded view of the present invention showing the platform braces tack welded to the platform.
Figure 12:
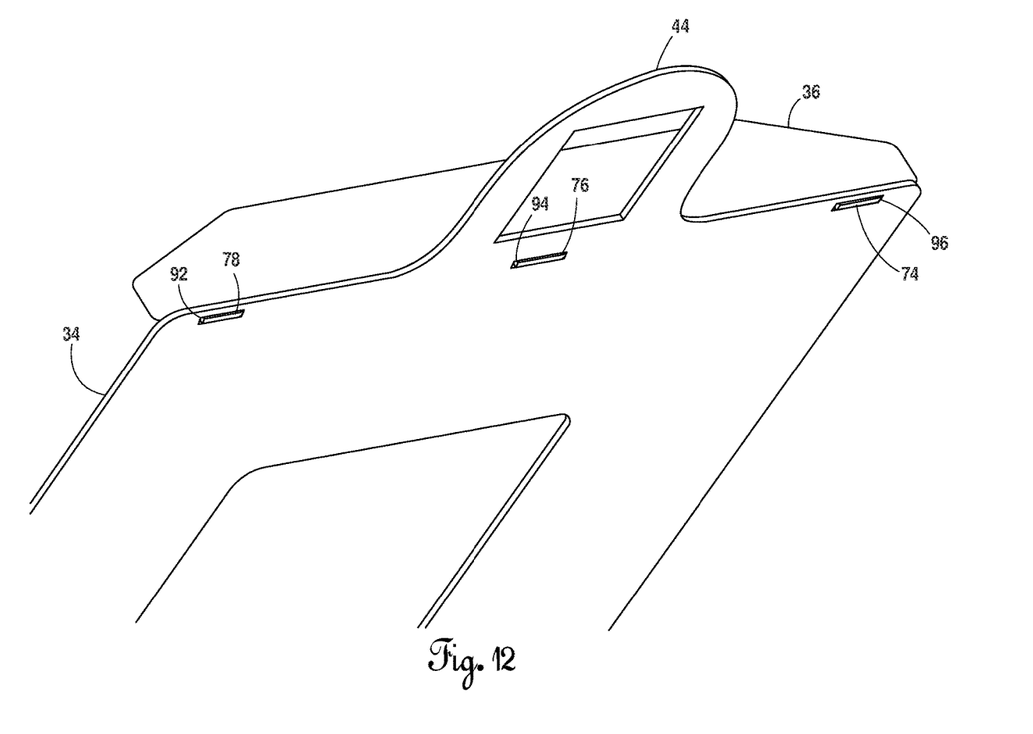
FIG. 12 is a partial close up view of the present invention showing a platform brace connected to the platform via platform tabs on platform brace matable with corresponding platform slots in platform.

Once platform braces 36 and 38 are connected and secured in place to platform 34 in a perpendicular relationship and the bracing tabs have traversed bracing slots and are flush with the opposite surface of platform 34, tack welding is performed on inner and outer sides of platform braces where platform braces touch platform 34. The tack welding is performed between bracing tabs and bracing slots, as shown in FIG. 11. A partial close up of platform brace 36 connected to platform 34 illustrating the connections between bracing tabs 74, 76 and 78 of platform brace 36 matable with bracing slots 96, 94 and 92 of platform 34 is shown in FIG. 12. The inventor is unaware of any other existing gate opener stand that has this tab/slot connection feature to securely connect platform braces to the platform.

Figure 13:
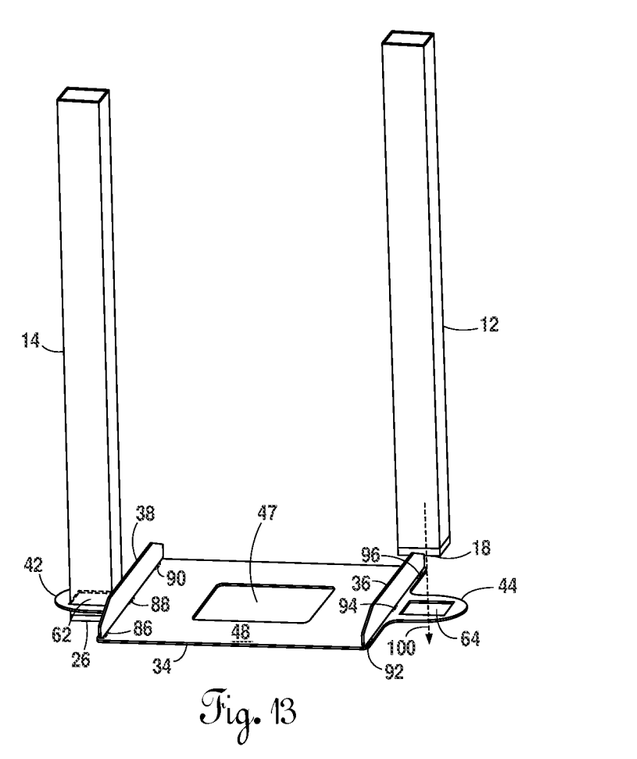
FIG. 13 is a perspective view of the present invention showing the plurality of tubing connected to the platform.

Turning now to FIG. 13, with tack welding complete, support tubing 12 and 14 are inserted down vertical axis 100 into and traverse apertures 64 and 62, respectively. Apertures 62 and 64 are 3"×3" and squarely configured to accommodate squarely configured support tubing 12 and 14. The ends of the pair of square support tubings are then slide into the apertures of the ears of the platform to a distance certain beyond the bottom surface of the platform. More particularly, support tubing 12 and 14 traverse apertures 62 and 64, respectively, until caps 18 and 26 at top ends 16 and 24 are one inch (1") past apertures 64 and 62, respectively, as shown in FIG. 13. All the while, gate opener stand is upside down on jig table (not shown).

Figure 14:
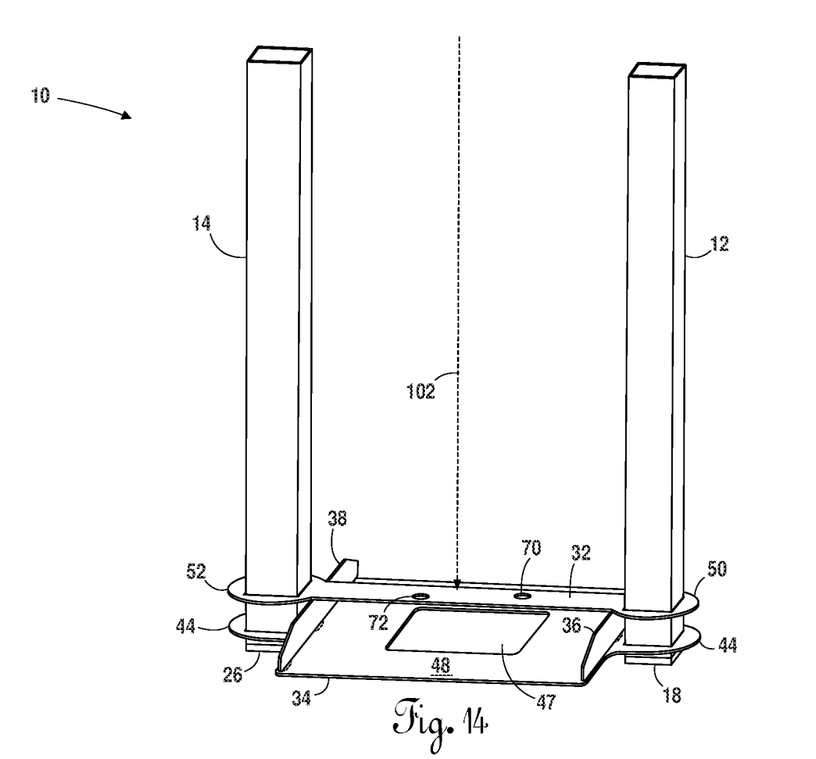
FIG. 14 is a perspective view of the present invention showing the horizontal brace placed over the plurality of tubing and connected to the platform via platform braces.

Referring now to FIG. 14, apertures 66 and 68 and round ends 50 and 52 of horizontal brace 32 are 3"×3" and squarely configured to accommodate squarely configured support tubing 12 and 14. Support tubing 12 and 14 pass through apertures 66 and 68 in round ends 50 and 52 of horizontal brace 32, allowing horizontal brace 32 to slide down vertical axis 102 until connecting with platform braces 36 and 38. Additional jig table clamps (not shown) are then used to clamp support tubing 12 and 14 to hold support tubing 12 and 14 secure, square and transverse (perpendicular) to all other components, as shown in FIG. 14.

Figure 15:
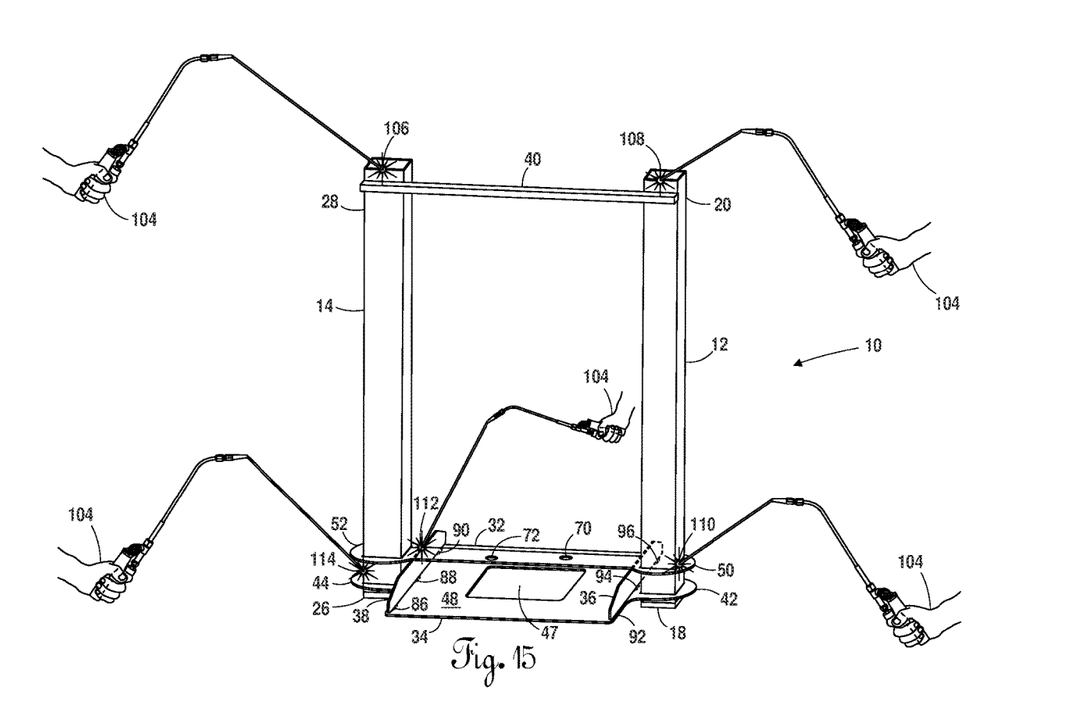
FIG. 15 is a perspective view of the present invention showing the tack welding of temporary brace, horizontal brace and platform.

Turning now to FIG. 15, the user 104 tack welds all components at strategic contact points 106, 108, 110, 112 and 114 to temporarily hold all components in place. This allows minor manipulation of the gate opener stand components by the user to adjust positioning of all components to ensure proper positioning vis-à-vis all other components. Temporary brace 40 is attached at one end to support tubing 12 and at the other end to support tubing 14 as additional stability during manufacture and assembly of the gate opener stand. However, once the gate opener stand is complete, temporary brace 40 becomes unnecessary and may be removed, as the full welding holds all components strongly and securely to each other.

Figure 16:
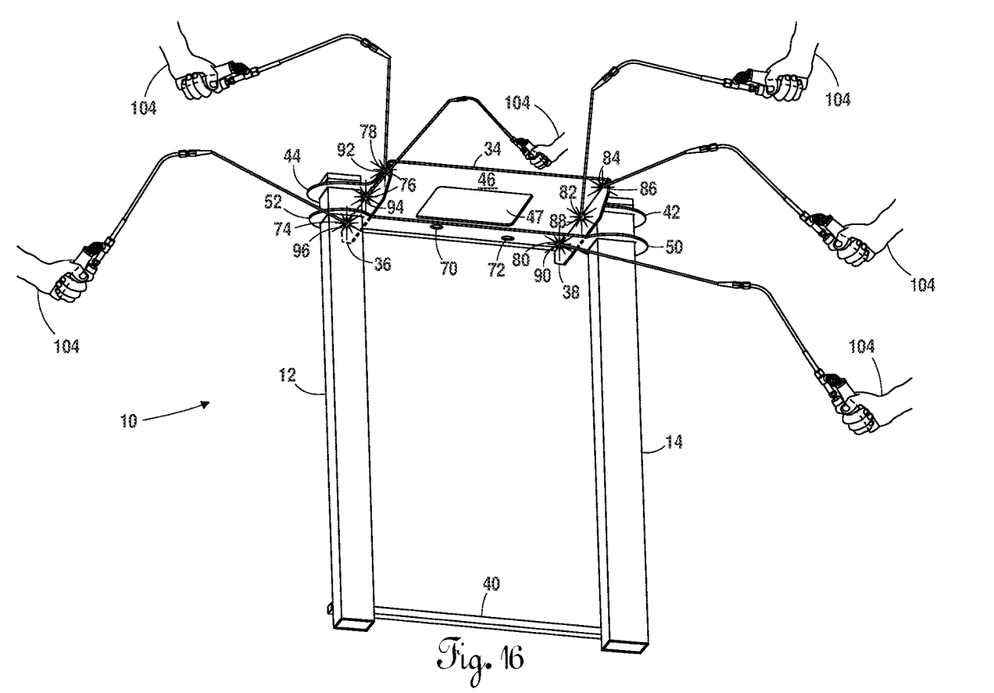
FIG. 16 is a perspective view of the present invention showing the permanent welding of all components of the gate opener stand.

Turning now to FIG. 16, with all components assembled and tack welded to each other (including sacrificial brace 40), gate opener stand 10 may be unclamped from the jig table (not shown). Gate opener stand 10 is then flipped to an upright position. All bracing slots in platform 34 are fully welded (not tack welded) to corresponding bracing tabs of platform braces 36 and 38, as shown in FIG. 16. Excessive heat is applied to all tack welding to ensure full weld of all previously tack welded contact points of various component parts and hot dip galvanizing does not warp platform 34. Rather, platform 34 remains flat during the galvanization process.

Once bracing slots and corresponding bracing tabs are completely joined, all components then are fully welded. The gate opener stands—several may be done in a batch—are stacked on pallets and sent to the galvanizer (not shown) where the gate opener stands are hot dipped galvanized for added strength and protection against corrosion. Now made and assembled, the gate opener stand of the present invention is complete and ready for sale.

The present invention is constructed using ⅛" thick or 11 gauge steel. However, other dimensions and robust materials, such as aluminum or steel alloys, may also be used in the construction and manufacture of the gate opener stand of the present invention and still remain within the contemplation of the present invention.

Installation of the gate opener stand of the present invention requires minimal experience and tools. Gate opener chassis sizes change and evolve on a regular basis. The gate opener stand of the present invention is well suited for this variation as the present invention also is capable of being retrofitted to accommodate gate openers of any make or model, without regard to size. In other words, the present invention is nonspecific to any one gate opener bolt pattern or post mount.

The gate opener stand of the present invention is designed, in most cases, for permanent installation. However, if desired by the user, the present invention may be removed and transferred to a different location and reinstalled in a matter of hours.

The present invention has application in the gate and fence industry, providing gates and fences to ranchers and farmers for residential and/or commercial use.

The various embodiments described herein may be used singularly or in conjunction with other similar devices. The present disclosure includes preferred or illustrative embodiments of specifically described apparatuses, assemblies, methods and systems. Alternative embodiments of such apparatuses, assemblies, methods and systems can be used in carrying out the invention as described herein. Other aspects and advantages of the present invention may be obtained from a study of this disclosure and the drawings.

I claim:

1. A gate opener stand comprising:
   a platform having extended ears on opposite sides, said extended ears having apertures therein;
   a horizontal brace having rounded ends, said rounded ends having apertures therein;
   a pair of platform braces connecting said platform with said horizontal brace;
   a plurality of support tubing connected to said platform and said horizontal brace, said plurality of support tubing traversing said apertures of said horizontal brace and said apertures of platform, said apertures of said horizontal brace and said apertures of platform aligning to accommodate said plurality of support tubing;

a temporary brace removably connected to said plurality of support tubing; and wherein said platform further includes an aperture in a square configuration in the center thereof.

\* \* \* \* \*